United States Patent
Wu

(10) Patent No.: US 9,781,662 B2
(45) Date of Patent: Oct. 3, 2017

(54) METHOD OF PERFORMING WIRELESS LOCAL AREA NETWORK MEASUREMENT IN WIRELESS COMMUNICATION SYSTEMS

(71) Applicant: HTC Corporation, Taoyuan County (TW)

(72) Inventor: Chih-Hsiang Wu, Taoyuan County (TW)

(73) Assignee: HTC Corporation, Taoyuan (TW)

(*) Notice: Subject to any disclaimer, the term of this patent is extended or adjusted under 35 U.S.C. 154(b) by 296 days.

(21) Appl. No.: 14/453,598

(22) Filed: Aug. 6, 2014

(65) Prior Publication Data
US 2015/0043373 A1    Feb. 12, 2015

Related U.S. Application Data

(60) Provisional application No. 61/862,529, filed on Aug. 6, 2013.

(51) Int. Cl.
*H04W 48/16* (2009.01)
*H04W 84/12* (2009.01)
*H04W 48/18* (2009.01)

(52) U.S. Cl.
CPC ............ *H04W 48/16* (2013.01); *H04W 48/18* (2013.01); *H04W 84/12* (2013.01)

(58) Field of Classification Search
CPC .............................. H04W 84/12; H04W 48/18
USPC ......................................................... 370/252
See application file for complete search history.

(56) References Cited

U.S. PATENT DOCUMENTS

| | | | |
|---|---|---|---|
| 2004/0044887 A1* | 3/2004 | Park ................. | H04W 36/30 713/1 |
| 2005/0202823 A1* | 9/2005 | Shaheen ........... | H04W 36/0061 455/436 |
| 2006/0258350 A1* | 11/2006 | Roy .................. | H04W 36/0061 455/435.1 |
| 2007/0265005 A1* | 11/2007 | Sitch ................ | H04W 48/18 455/435.1 |
| 2008/0192806 A1* | 8/2008 | Wyper .............. | H04W 72/1215 375/133 |
| 2010/0234026 A1* | 9/2010 | Tenny ............... | H04W 36/0061 455/436 |

(Continued)

OTHER PUBLICATIONS

3GPP TR 37.834 V0.3.0(May 2013), "3rd Generation Partnership Project; Technical Specification Group Radio Access Network; Study on WLAN/3GPP Radio Interworking (Release 12)", pp. 1-14.*

(Continued)

*Primary Examiner* — Charles C Jiang
*Assistant Examiner* — Kyaw Z Soe
(74) *Attorney, Agent, or Firm* — Winston Hsu

(57) ABSTRACT

A method of performing WLAN measurement for a communication device in a wireless communication system is disclosed. The method comprises receiving WLAN measurement configuration including a WLAN identity of a WLAN that is to be measured, from a network, scanning WLAN channels to detect the WLAN identity, measuring received power in a channel when the WLAN identity is detected on the WLAN channel, determining if a WLAN access point (AP) can be connected, and transmitting a first message indicating the WLAN is not available to the network after the WLAN identity is not detected or after the WLAN identity is detected but the WLAN access point (AP) cannot be connected.

16 Claims, 9 Drawing Sheets

(56) References Cited

U.S. PATENT DOCUMENTS

2014/0315542 A1* 10/2014 Shatil .................... H04W 36/32
455/432.1

OTHER PUBLICATIONS

3GPP TS 36.331 V11.4.0(Jun. 2013), "3rd Generation Partnership Project; Technical Specification Group Radio Access Network; Evolved Universal Terrestrial Radio Access (E-UTRA); Radio Resource Control (RRC); Protocol specification (Release 11)", pp. 1-346.

3GPP TS 25.331 V11.6.0(Jun. 2013), "3rd Generation Partnership Project; Technical Specification Group Radio Access Network; Radio Resource Control (RRC); Protocol specification (Release 11)", pp. 1~2, section 8.2.2.3 (in pp. 173-195) and section 8.3.3 (in pp. 259-263).

* cited by examiner

| Event | Description |
|---|---|
| W1 | WLAN becomes better than a threshold (to trigger traffic steering to WLAN) |
| W2 | WLAN becomes worse than a threshold (to trigger traffic steering from WLAN) |
| W3 | 3GPP Cell's radio quality becomes worse than threshold1 and WLANs radio quality becomes better than threshold2 (to trigger traffic steering to WLAN) |
| W4 | WLAN's radio quality becomes worse than threshold1 and 3GPP Cell's radio quality becomes better than threshold2 (to trigger traffic steering from WLAN) |

FIG. 3

| Identifier | Description | Availability in WLAN |
|---|---|---|
| BSSID | Basic service set identifier. For infrastructure BSS, the BSSID is the MAC address of the wireless access point | Beacon or Probe Response |
| SSID | Service Set Identifier. The SSID can be used in multiple, possibly overlapping, BSSs | Beacon or Probe Response |
| HESSID | Homogeneous Extended Service Set Identifier. A MAC address whose value shall be configured by the Hotspot Operator with the same value as the BSSID of one of the APs in the network. All APs in the wireless network shall be configured with the same HESSID value | Beacon or Probe Response (802.11) |
| Domain Name List | Domain Name list element provides a list of one or more domain names of the entity operating the WLAN access network | ANQP (HS 2.0) |
| Operating class, channel number | Indication of the target WLAN frequency. See Annex E of 802.11 [5] for definitions of the different operating classes | N/A |

FIG. 4

| Identifier | Description | Availability in WLAN |
|---|---|---|
| RCPI | Received Channel Power Indicator<br>Measure of the received RF power in the selected channel for a received frame in the range of −110 to 0 dBm | Measurement |
| RSNI | Received Signal to Noise Indicator.<br>An indication of the signal to noise plus interference ratio of a received IEEE 802.11 frame<br>Defined by the ratio of the received signal power (RCPI-ANPI) to the noise plus interference power (ANPI) in steps of 0.5 dB in the range from −10 dB to +117 dB | Measurement |
| BSS Load | Contains information on the current STA population and traffic levels in the BSS | Beacon or Probe Response (802.11k) |
| WAN metrics | Includes estimates of DL and UL speeds and loading as well as link status and whether the WLAN AP is at capacity. | ANQP (HS 2.0) |

FIG. 5

METHOD OF PERFORMING WIRELESS LOCAL AREA NETWORK MEASUREMENT IN WIRELESS COMMUNICATION SYSTEMS

CROSS REFERENCE TO RELATED APPLICATIONS

This application claims the benefit of U.S. Provisional Application No. 61/862,529, filed on Aug. 6, 2013 and entitled "Method and Apparatus for measuring WLAN network in a wireless communication system", the contents of which are incorporated herein in their entirety.

BACKGROUND OF THE INVENTION

1. Field of the Invention

The present invention relates to a method used in a communication device in a wireless communication system, and more particularly, to a method of performing wireless local area network (WLAN) measurement in a wireless communication system.

2. Description of the Prior Art

The 3rd Generation Partnership Project (3GPP) has developed a universal mobile telecommunications system (UMTS) which adopts a wideband code division multiple access (WCDMA) as a wireless air interface. In the UMTS, a radio access network known as a universal terrestrial radio access network (UTRAN) includes multiple Node-Bs (NBs) for communicating with multiple user equipments (UEs). The WCDMA provides high frequency spectrum utilization, universal coverage, and high-speed multimedia data transmission which are beneficial for the UEs and the NBs of the UMTS. Furthermore, a long-term evolution (LTE) system supporting the 3GPP Rel-8 standard and/or the 3GPP Rel-9 standard is now being developed by the 3GPP as a successor of the UMTS, to further enhance performance of the UMTS to satisfy users' increasing needs. The LTE system includes a new radio interface and radio network architecture that provides a high data rate, low latency, packet optimization, and improved system capacity and coverage. In the LTE system, a radio access network known as an evolved UTRAN (E-UTRAN) includes multiple evolved NBs (eNBs) for communicating with multiple UEs, and communicates with a core network including a mobility management entity (MME), serving gateway, etc for NAS (Non Access Stratum) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

In recent years, there has been growing popularity for the wireless local area network (WLAN) for wireless communication. WiFi is a synonym for WLAN standards in which the main standards are IEEE 802.11ac, 802.11n, 802.11g, 802.11b and 802.11a. Within the WiFi standard there are numerous required and optional modes as well as a continually advancing set of enhancements and proposed enhancements. WiFi can be found in practically every new portable computer and in an increasing number of desktop computers, telephones, televisions, digital media players and cellular phones. WiFi-based Local Area Networks are found in most airports, coffee shops, businesses, college campuses, city centers and an increasing number of other areas.

WLAN interworking and integration is currently supported by 3GPP specifications at the core network (CN) level, including both seamless and non-seamless mobility to WLAN. 3GPP have agreed to study potential RAN level enhancements for WLAN/3GPP Interworking in Release-12. The following issues should be taken into account during the study:
1. Operator-deployed WLANs are often under-utilized.
2. User experience is suboptimal when UE connects to an overloaded WLAN.
3. Unnecessary WLAN scanning may drain UE battery resources.

Please refer to FIG. 1, which is a schematic diagram of a wireless communication system 10 according to the prior art. The wireless communication system includes a cellular network 100, a WLAN 102 and a communication device 104. The cellular network can be an E-UTRAN, UTRAN or CDMA network and the communication device 104 can be a UE. In detail, the communication device 104 can transmit and receive data via the cellular network and/or WLAN.

Please refer to FIG. 2, which is a message sequence chart of a wireless communication system 10 according to the prior art. The eNB/RNC configures the UE (i.e. communication device 104) a measurement control including the identity of the target WLAN to be measured. The UE is triggered to send a measurement report by rules set by the measurement control. Therefore, the eNB/RNC sends the steering command message to the UE to perform the traffic steering to/from WLAN based on the reported measurements and loading in the RAN.

For measurement control, the following examples are types of information can be configured for the UE to measure the operator-deployed WLAN:
1. Measurement events to trigger reporting as defined in a table shown in FIG. 3.
2. Target identification as defined in a table shown in FIG. 4. The target identification is used to indicate to the UE which WLAN to be considered for the measurement procedure including the target WLAN identity and the operating channels to search for.
3. Measurements to report for WLAN as defined in a table shown in FIG. 5.

The UE transmits a measurement report including received power in a channel to the (cellular) network when the target WLAN identity is detected on the channel. After the network receives the measurement report, the network sends the steering command to steering traffic to/from WLAN. However, those skilled in the art have never considered that the UE may detect the WLAN identity on the channel but cannot connect to a WLAN access point (AP). In this case, the UE cannot transmit/receive through WLAN even the UE receives the steering command to steering traffic to/from the WLAN.

SUMMARY OF THE INVENTION

It is there for an objective to provide a method of performing wireless local area network (WLAN) measurement in a wireless communication system to solve the above problem.

The present invention discloses a method of performing WLAN measurement for a communication device in a wireless communication system. The method comprises receiving WLAN measurement configuration including a WLAN identity of a WLAN that is to be measured, from a network of the wireless communication system, scanning WLAN channels to detect the WLAN identity, measuring received power in a channel when the WLAN identity is detected on the WLAN channel, determining if a WLAN access point (AP) can be connected, and transmitting a first message indicating the WLAN is not available to the network after the WLAN identity is not detected or after the WLAN identity is detected but the WLAN access point (AP) cannot be connected.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 3-5 are schematic diagrams of measurement configuration and measurement report.

DETAILED DESCRIPTION

Figure 2:
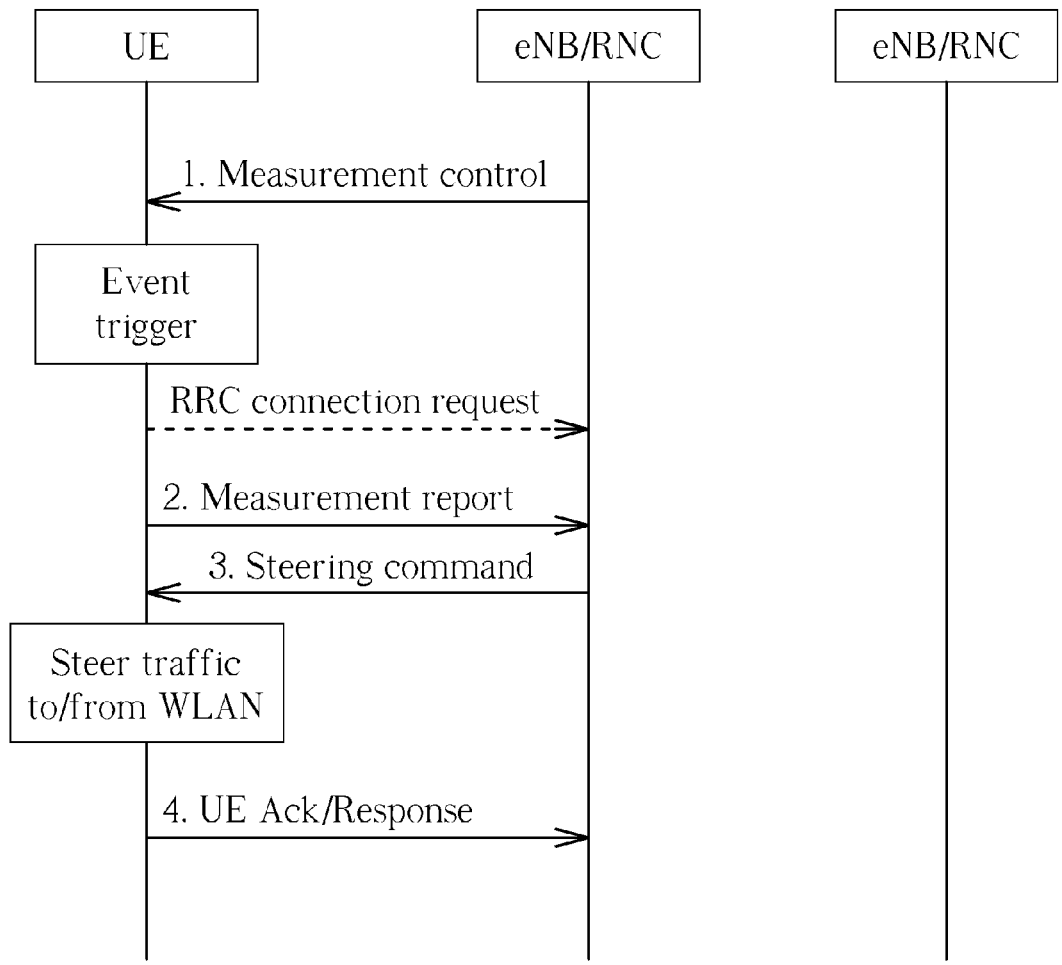
FIG. 2 is a message sequence chart of a wireless communication system according to an example of the prior art.
Figure 6:
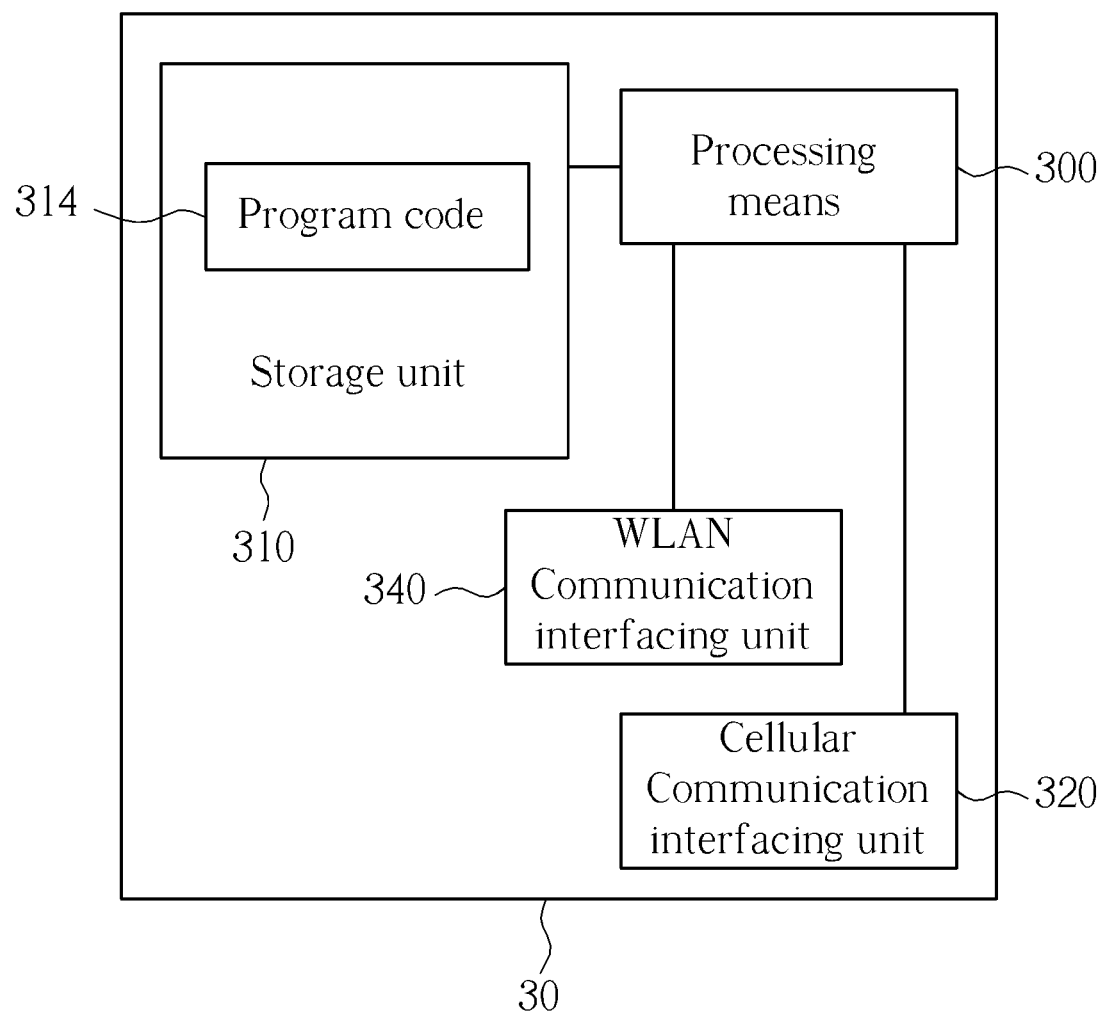
FIGS. 6-7 are schematic diagrams of a communication apparatus according to an example of the present invention.

Please refer to FIG. 6, which is a schematic diagram of a communication apparatus 30 according to an example of the present invention. The communication apparatus 30 can be the network (i.e. an eNB/RNC) or the UE shown in FIG. 2, but is not limited herein. The communication apparatus 30 may include a processing means 300 such as a microprocessor or Application Specific Integrated Circuit (ASIC), a storage unit 310, a cellular communication interfacing unit 320 and a WLAN communication interfacing unit 340. The storage unit 310 maybe any data storage device that can store a program code 314, accessed and executed by the processing means 300. Examples of the storage unit 310 include but are not limited to read-only memory (ROM), flash memory, random-access memory (RAM), CD-ROM/DVD-ROM, magnetic tape, hard disk and optical data storage device. The cellular communication interfacing unit 320 is preferably a transceiver and is used to transmit to a cellular network and receive signals (e.g., messages or packets) from the cellular network according to processing results of the processing means 300. The WLAN communication interfacing unit 340 is preferably a transceiver and is used to transmit to a WLAN and receive signals (e.g., messages or packets) from the WLAN according to processing results of the processing means 300.

Figure 7:
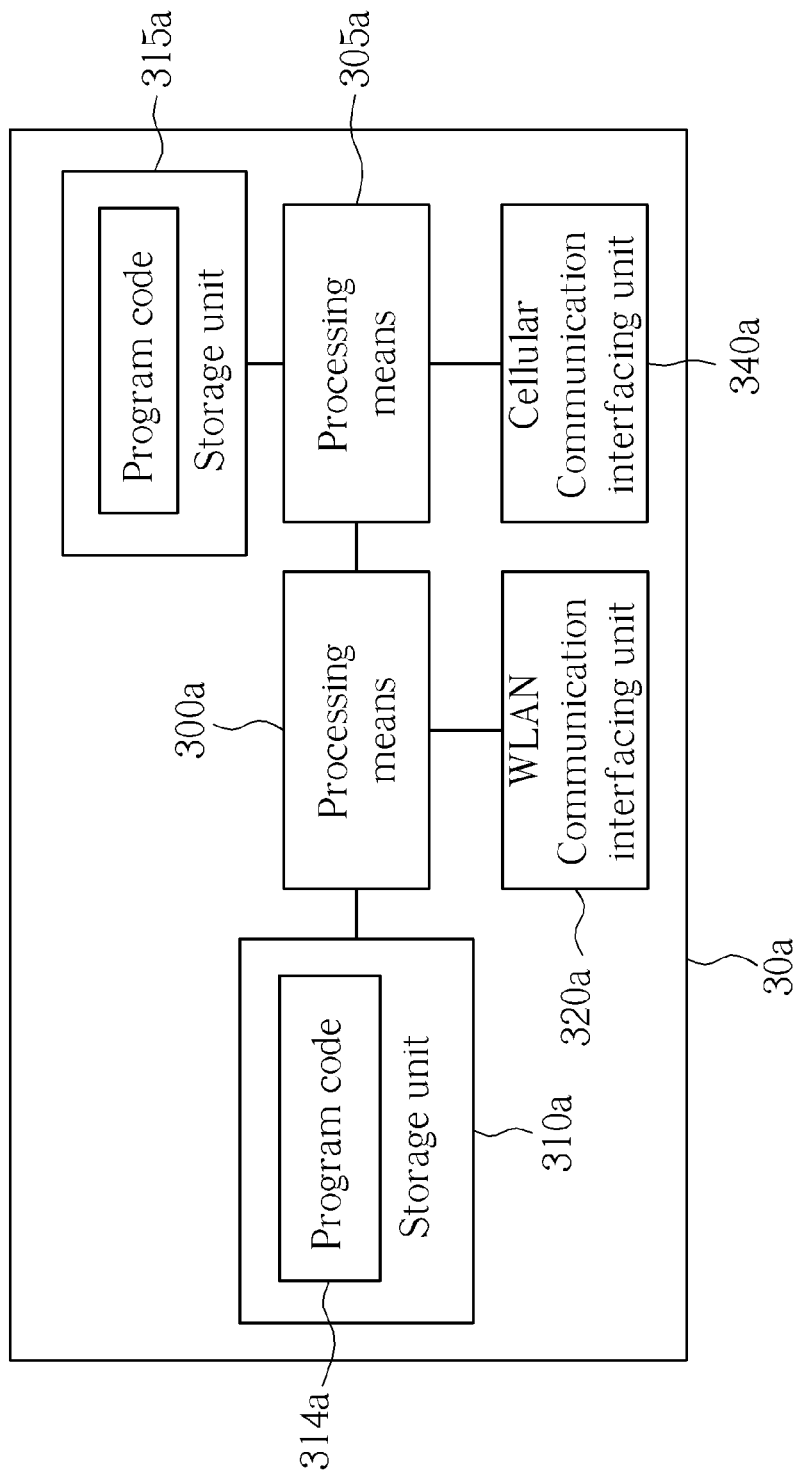

Please refer to FIG. 7, which is a schematic diagram of a communication apparatus 30a according to an example of the present invention. The communication apparatus 30a can be the network (i.e. an eNB/RNC) or the UE shown in FIG. 2, but is not limited herein. The communication apparatus 30a may include a processing means 300a such as a microprocessor or Application Specific Integrated Circuit (ASIC), a processing means 305a such as a microprocessor or Application Specific Integrated Circuit (ASIC), a storage unit 310a, a storage unit 315a, a cellular communication interfacing unit 340a and a WLAN communication interfacing unit 320a. The storage unit 310a may be any data storage device that can store a program code 314a, accessed and executed by the processing means 300a. Examples of the storage unit 310a include but are not limited to read-only memory (ROM), flash memory, random-access memory (RAM), CD-ROM/DVD-ROM, magnetic tape, hard disk and optical data storage device. The cellular communication interfacing unit 340a is preferably a transceiver and is used to transmit to a cellular network and receive signals (e.g., messages or packets) from the cellular network according to processing results of the processing means 305a. The WLAN communication interfacing unit 320a is preferably a transceiver and is used to transmit to a WLAN and receive signals (e.g., messages or packets) from the WLAN according to processing results of the processing means 300a.

Figure 1:
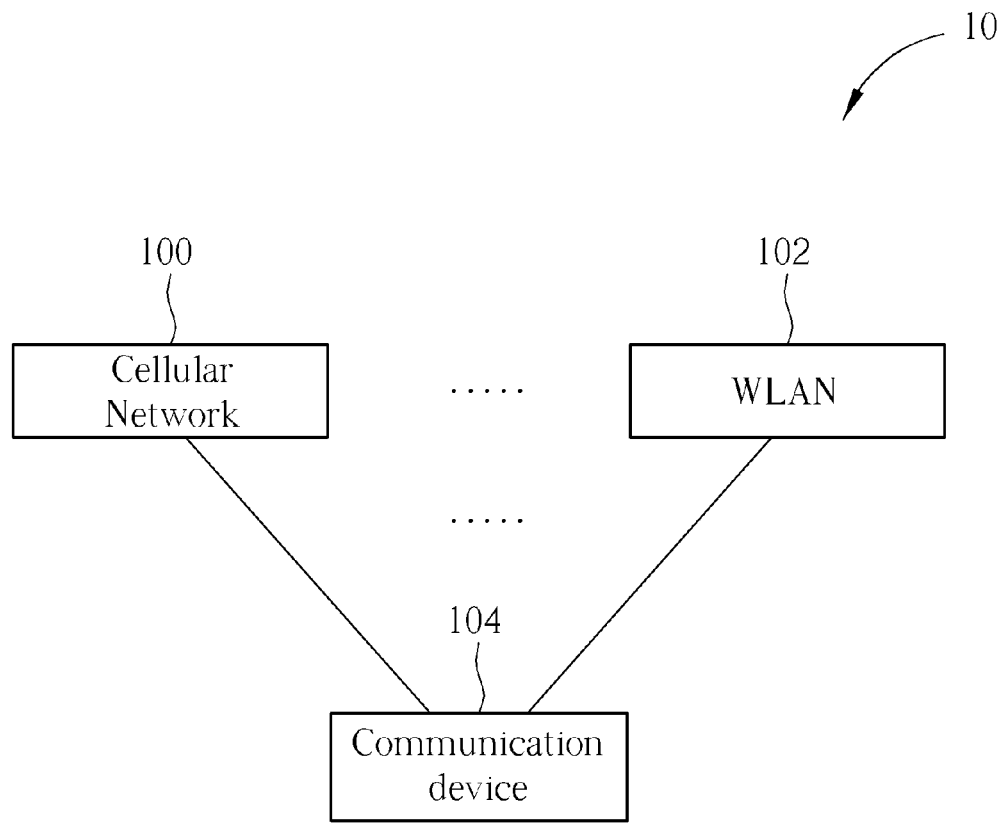
FIG. 1 is a schematic diagram of a wireless communication system according to an example of the prior art.
Figure 8:
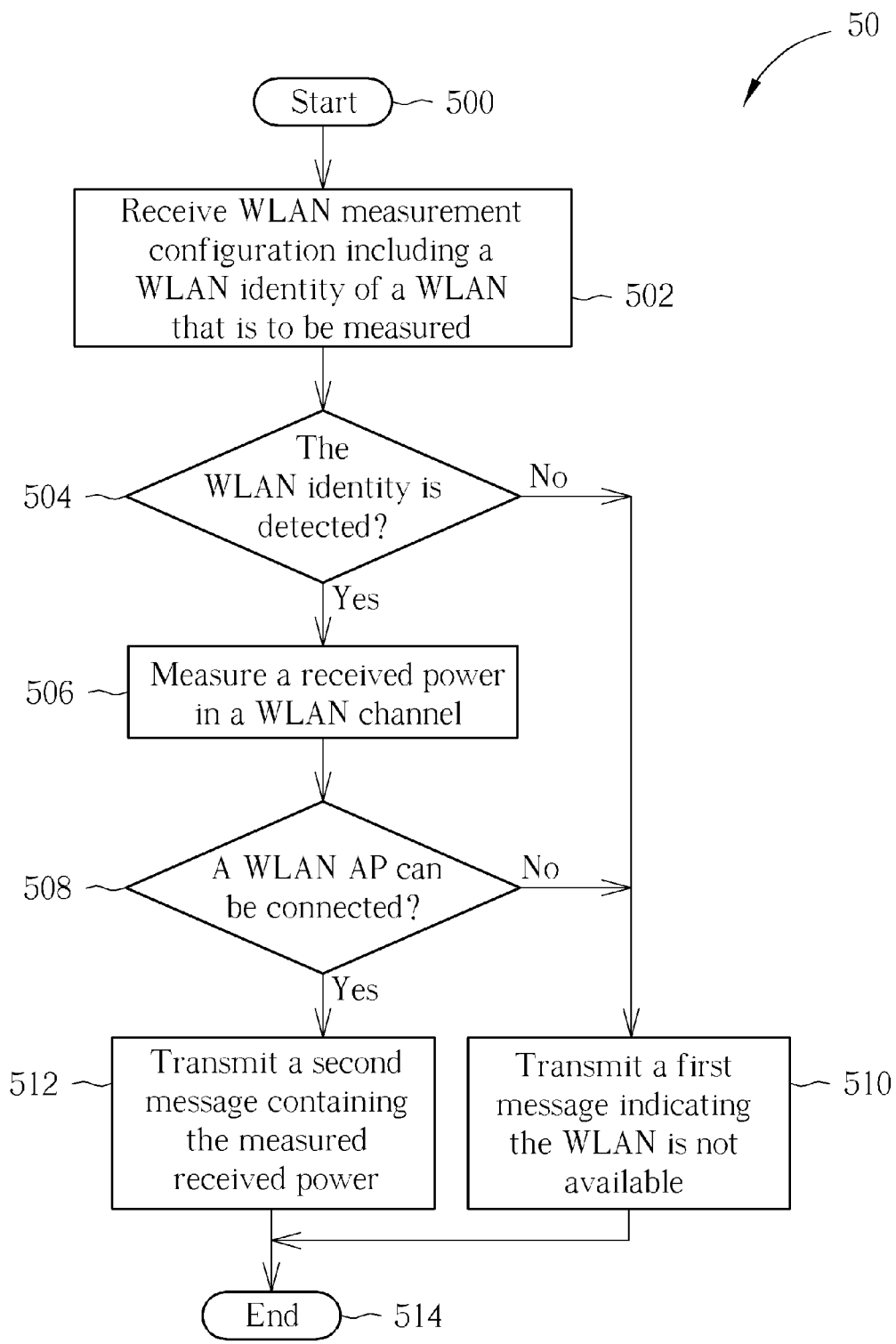
FIG. 8 is a flowchart of a process according to an example of the present invention.

Please refer to FIG. 8, which is a flowchart of a process 50 according to an example of the present invention. The process 50 is utilized in the communication device 104 shown in FIG. 1, for performing WLAN measurement procedure in the cellular network 100. The process 50 can be utilized in the communication device and may be compiled into the program code 314. The process 50 includes the following steps:

Step 500: Start.

Step 502: Receive WLAN measurement configuration including a WLAN identity of a WLAN that is to be measured from the cellular network.

Step 504: Scan WLAN channels to detect the WLAN identity. If the WLAN identity is detected, perform Step 506; else, perform Step 510.

Step 506: Measure a received power in a WLAN channel.

Step 508: Determine if a WLAN AP can be connected. If the WLAN AP can be connected, perform Step 512; else, perform Step 510.

Step 510: Transmit a first message indicating the WLAN is not available to the cellular network.

Step 512: Transmit a second message containing the measured received power to the cellular network.

Step 514: End.

In Step 502, the communication device 104 receives WLAN measurement configuration including a WLAN identity of a WLAN that is to be measured (e.g., WLAN 102 or another WLAN), from the cellular network 100. The WLAN measurement configuration is sent by the cellular network 100 to inform/instruct the communication device 104 to perform a WLAN measurement procedure to report WLAN measurement results. After the communication device 104 receives the WLAN measurement configuration, in Step 504 the communication device 104 scans WLAN channels to detect if the WLAN identity included in the WLAN measurement configuration is transmitted (broadcasted, by a WLAN AP) on the WLAN channel. The WLAN identity can be Basic Service Set identifier (BSSID), Service Set Identifier (SSID) or Homogeneous Extended Service Set Identifier (HESSID) included in beacon signal transmitted by a WLAN AP. If the WLAN measurement configuration provides at least one channel number, the communication device may only scan the at least one channel number. If the WLAN identity is detected on the WLAN channel, in Step 506 the communication device 104 measures the received power in the WLAN channel; otherwise, if the WLAN identity is not detected, in Step 510 the communication device 104 transmits a first message indicating the WLAN is not available, to the cellular network 100. The communication device 104 may measure the received power of the beacon signal or data frame transmitted by the WLAN AP broadcasting the WLAN identity. In one example, the first message may comprise a measurement report containing no measured received power or containing a specific value indicating the WLAN is not available.

After the communication device 104 measures the received power in the WLAN channel, in Step 508 the communication device 104 further determine if a WLAN access point (AP) can be connected. If determining the WLAN AP cannot be connected, the communication device 104 also transmits the first message indicating the WLAN is not available to the cellular network 100, as in Step 510; in this situation the first message may comprise a measurement report containing no measured received power or containing a specific value indicating the WLAN is not available.

On the other hand, if determining that the WLAN AP can be connected, in Step 512 the communication device 104 transmits a second message containing the measured received power to the cellular network 100. The second message may include a measurement report containing the measured received power.

In another example different form the process 50, the communication device 104 can determine if the WLAN AP can be connected earlier than it measures the received power in the WLAN channel.

Based on the process 50, a UE (e.g., the communication device 104) can transmit a message indicating the WLAN is not available to the cellular network when the WLAN identity is not detected or the WLAN identity is detected but a WLAN AP cannot be connected.

On the other side, when the cellular network 100 receives a first message indicating the WLAN is not available, the cellular network 100 knows that the communication device 104 does not detect the WLAN identity or the communication device 104 detects the WLAN identity but cannot connect to the WLAN AP. In response, the cellular network 100 does not send the steering command to the communication device 104 for steering traffic to the WLAN 102.

In addition, when the cellular network 100 receives the first message indicating the WLAN is not available, the cellular network 100 may release the WLAN measurement configuration. In one example, the cellular network 100 may further transmit a third message to the communication device 104 to release the WLAN measurement configuration. In another example, the communication device 104 may release the WLAN measurement configuration automatically when the WLAN identity is not detected or the WLAN identity is detected but the WLAN AP cannot be connected. Thus, communication device 104 does not continuously scan or measure WLAN channel, so as to save power of the communication device 104.

Note that, step 508 (that is to determine if the WLAN AP can be connected) can be implemented by a procedure, which can be an authentication procedure, association procedure, WEP, WPA or WPA2 encryption procedure, or DHCP IP request. In other words, the communication device 104 considers the WLAN AP is connected when the communication device 104 successfully performs the authentication procedure, the association procedure, the WEP, WPA or WPA2 encryption procedure, or successfully gets an IP address. The communication device 104 cannot connect to the WLAN AP when the WLAN AP encounters some failure conditions, e.g. authentication fails, association fails, security fails (e.g. wrong security key), or IP address cannot be got (i.e. DHCP fails). On the other side, when the communication device 104 successfully performs an authentication procedure (or another procedure mentioned above) after the WLAN identity is detected, the communication device 104 transmits the measurement report including measured received power in the channel (e.g., transmits the second message as in Step 512, including the measurement report containing the measured received power).

In an embodiment, the communication device 104 scans the WLAN channel (to detect the WLAN identity) not only once but scans the WLAN channel periodically if the WLAN identity is not detected for a current scanning; in other words, the communication device 104 periodically scans the WLAN channel until the WLAN identity is detected. When the communication device 104 cannot detect the WLAN identity after scanning the WLAN channels once, the communication device performs the next scan after a time interval in order to save power of battery. The time interval for periodically scanning can be decided by the communication device 104 or configured by the cellular network 100. Therefore, the communication device 104 can make WLAN transceiver enter a sleep mode between two scans. In another example, the communication device 104 may periodically scan WLAN channels to detect the WLAN identity for a certain number of times or until the communication device 104 detects the WLAN identity.

Figure 9:
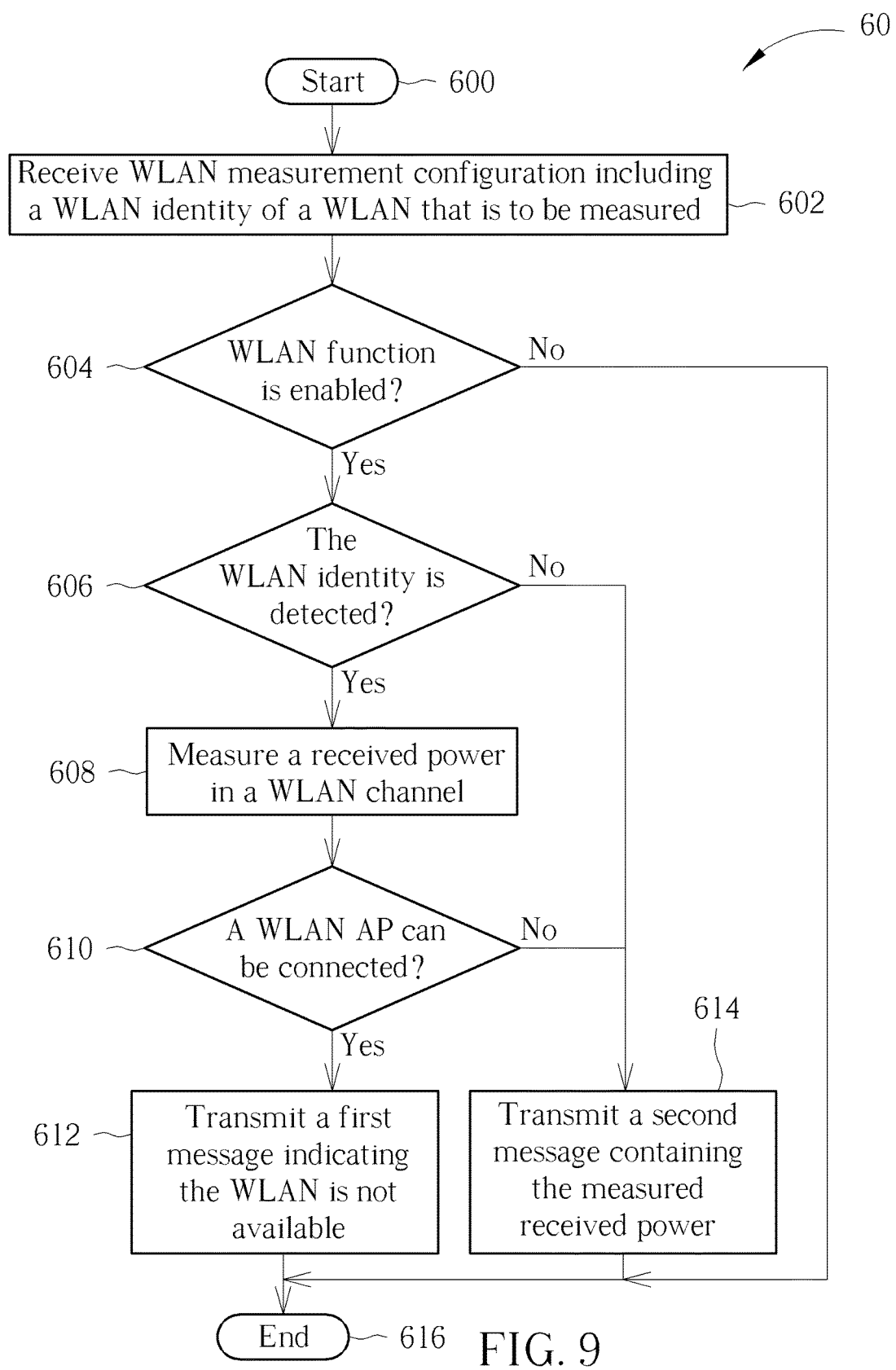
FIG. 9 is a flowchart of a process according to an example of the present invention.

Please refer to FIG. 9, which is a flowchart of a process 60 according to an example of the present invention. The process 60 can be utilized in a communication device (e.g., the communication device 104 in FIG. 1) for performing a WLAN measurement procedure in the cellular network, and process 60 may be compiled into the program code 314. The process 60 includes the following steps:

Step 600: Start.
Step 602: Receive WLAN measurement configuration including a WLAN identity of a WLAN that is to be measured from the cellular network.
Step 604: Determine if the WLAN function of the communication device is enabled.
Step 606: Scan WLAN channels to detect the WLAN identity. If the WLAN identity is detected, perform Step 608; else, perform Step 612.
Step 608: Measure a received power in a WLAN channel.
Step 610: Determine if a WLAN AP can be connected. If the WLAN AP can be connected, perform Step 614; else, perform Step 612.
Step 612: Transmit a first message indicating the WLAN is not available to the cellular network.
Step 614: Transmit a second message containing the measured received power to the cellular network.
Step 616: End.

The process 60 is similar to the process 50 except Step 604 which is not included in the process 50. The process 60 aims on checking the WLAN function is enabled or disabled before scanning WLAN channel, for saving power wasted on unnecessary scanning. Those similar steps can be referred to the process 50 and omitted herein.

For scanning operation in step 606 shown in FIG. 9, the communication device 104 scans WLAN channels to detect if the WLAN identity included in the WLAN measurement configuration is found in the WLAN channel, when the WLAN function of the communication device 104 is enabled. The communication device 104 may determine to scan WLAN channels to detect the WLAN identity when the WLAN function of the communication device 104 is enabled (whatever by a user or by automatic control) and the communication device 104 is not transmitting IP packets to another WLAN which has a different WLAN identity and not receiving IP packets from the another WLAN. The communication device 104 may determine to scan WLAN channels to detect the WLAN identity when the WLAN function of the communication device is enabled, and the communication device is not transmitting IP packets to another WLAN which has a different WLAN identity and not receiving IP packets from the another WLAN, and the communication device 104 is not acting as a Hotspot mode (which is implemented as a software access point and called a portable hotspot) responsible for routing IP packets via WLAN function from another communication device to the cellular network 100 or from the cellular network 100 to another communication device.

In other words, the communication device 104 does not scan WLAN channels to detect the WLAN identity and/or does not measure received power in the channel according to the WLAN measurement configuration when the WLAN function of the communication device is disabled, the communication device has being transmitting IP packets to another WLAN which has a different WLAN identity or receiving IP packets from the another WLAN or the communication device is in Hotspot mode (i.e. acting as a hotspot).

Note that, when the Hotspot mode is enabled, the communication device 104 should consider the station mode of the WLAN function is disabled or not enabled. In other words, the communication device 104 cannot act as a hotspot (to provide routing function to another communication device) and act as a station (to connect to the infrastructure network through a conventional WLAN AP concurrently. The communication device 104 stops scanning the WLAN channels or measuring received power in the WLAN channels according to the WLAN measurement configuration or any configuration received from the cellular network 100.

In an embodiment, when the WLAN function of the communication device 104 is disabled (by a user or by automatic control) and in this situation the communication device 104 receives the WLAN measurement configuration, the communication device 104 pops out a message on a display to ask the user to decide whether to enable the WLAN function (e.g. switch on WLAN communication interfacing unit, e.g. RF transceiver, of the communication device 104). If the user decides to enable the WLAN function, the communication device 104 scans WLAN channels to detect the WLAN identity. In addition, when the WLAN function of the communication device 104 is disabled and in this situation the communication device 104 receives the WLAN measurement configuration, the communication device 104 pops out a message on a display to ask the user to decide whether to enable the WLAN function.

In other embodiments, the communication device 104 transmits a first indication indicating the WLAN function is enabled to the cellular network 100 when the WLAN function of the communication device 104 is switched from a disabled state to an enabled state, e.g. switched by a user. The cellular network 100 transmits the communication device 104 the WLAN measurement configuration including the WLAN identity to be measured in response to the first indication. When the WLAN function is switched from the enabled state to the disabled state, e.g. switched by the user, the communication device 104 transmits a second indication indicating the WLAN function is disabled to the cellular network 100.

Furthermore, when the cellular network 100 receives the second indication indicating the WLAN function is disabled, the cellular network 100 may release the WLAN measurement configuration. The cellular network 100 may further transmit a message to the communication device 104 to release the WLAN measurement configuration. Alternatively, the communication device 104 releases the WLAN measurement configuration automatically when WLAN function is switched to the disabled state.

In another example, when the WLAN function of the communication device 104 is switched to the disabled state by a user and in this situation the communication device 104 receives the WLAN measurement configuration, the communication device 104 may silently enable the WLAN function to measure received power in a WLAN channel and does not show that the WLAN function is in the enabled state on the display, e.g., to make a Wi-Fi function shortcut on the display keep showing OFF). Hence the user is not aware of the WLAN function is enabled. Moreover, when the communication device 104 steers traffic to a WLAN, the communication device 104 may silently perform the traffic steering and does not show that the WLAN function is in the enabled state on the display, in order not to make the user aware of the WLAN function is enabled. There may be several benefits of silently enabling the WLAN function; one of the benefits is to avoid the user confused. Another one of the benefits is an operator can maximize its spectrum efficiency by taking both WLAN and cellular network into account to allocate spectrum resources to all communication devices.

In conclusion, by using the process 50, the communication device can determine if the WLAN AP can be connected before sending the measurement report including the received power in the WLAN channels; and by using the process 60, the communication device can determine if the WLAN function of the communication device is enabled before starting scanning the WLAN channels. Therefore, the unnecessary scanning and measurement can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method of performing wireless local area network (WLAN) measurement for a communication device in a wireless communication system, comprising:
receiving WLAN measurement configuration including a WLAN identity of a WLAN that is to be measured, from a network of the wireless communication system;
scanning WLAN channels to detect the WLAN identity;
measuring received power in a channel when the WLAN identity is detected on the WLAN channel;
determining if a WLAN access point (AP) can be connected;
transmitting a first message indicating the WLAN is not available to the network when the WLAN identity is not detected or when the WLAN identity is detected but the WLAN AP cannot be connected;
transmitting a second message containing the measured received power to the network when the WLAN identity is detected and the WLAN AP is connected; and
determining if a WLAN function of the communication device is enabled, before scanning the WLAN channels to detect the WLAN identity.

2. The method of claim 1, further comprising:
scanning the WLAN channels to detect the WLAN identity after a time interval, when the WLAN identity is not detected.

3. The method of claim 1, wherein scanning WLAN channels to detect the WLAN identity comprises:
scanning WLAN channels to detect the WLAN identity, when a WLAN function of the communication device is enabled and the communication device is not transmitting or receiving IP packets to or from another WLAN which has a different WLAN identity.

4. The method of claim 1, wherein scanning WLAN channels to detect the WLAN identity comprises:
scanning WLAN channels to detect the WLAN identity, when a WLAN function of the communication device is enabled, and the communication device is not transmitting or receiving IP packets to or from another WLAN which has a different WLAN identity, and the communication device is not acting as a hotspot responsible for routing IP packets for a second communication device of the wireless communication system.

5. The method of claim 1, further comprising:
transmitting a first indication indicating the WLAN function of the communication device is enabled when WLAN function is switched from a disabled state to an enabled state.

6. The method of claim 1, further comprising:
transmitting a second indication indicating the WLAN function of the communication device is disabled when the WLAN function is switched from an enabled state to a disabled state.

7. The method of claim 6, further comprising:
receiving a second message indicating the communication device to release the WLAN measurement configuration, from the network receiving the second indication; and
releasing the WLAN measurement configuration.

8. The method of claim 1, further comprising:
releasing the WLAN measurement configuration automatically when the WLAN identity is not detected or when the WLAN identity is detected but the WLAN AP cannot be connected.

9. The method of claim 1, wherein the first message indicating the WLAN is not available comprises a measurement report containing no measured received power or containing a specific value indicating the WLAN is not available.

10. The method of claim 1, further comprising:
enabling a WLAN function of the communication device and not displaying the enabled state of the WLAN function, after receiving the WLAN measurement configuration under a state that the WLAN function of the communication device is disabled.

11. A method of performing wireless local area network (WLAN) measurement for a communication device in a wireless communication system, comprising:
receiving WLAN measurement configuration including a WLAN identity of a WLAN that is to be measured, from a network of the wireless communication system;
scanning WLAN channels to detect the WLAN identity;
measuring received power in a channel when the WLAN identity is detected on the WLAN channel;
determining if a WLAN access point (AP) can be connected;
transmitting a first message indicating the WLAN is not available to the network when the WLAN identity is not detected or when the WLAN identity is detected but the WLAN AP cannot be connected;
scanning the WLAN channels to detect the WLAN identity after a time interval, when the WLAN identity is not detected; and
determining if a WLAN function of the communication device is enabled, before scanning the WLAN channels to detect the WLAN identity.

12. The method of claim 11, wherein scanning WLAN channels to detect the WLAN identity comprises:
scanning WLAN channels to detect the WLAN identity, when a WLAN function of the communication device is enabled and the communication device is not transmitting or receiving IP packets to or from another WLAN which has a different WLAN identity.

13. The method of claim 11, wherein scanning WLAN channels to detect the WLAN identity comprises:
scanning WLAN channels to detect the WLAN identity, when a WLAN function of the communication device is enabled, and the communication device is not transmitting or receiving IP packets to or from another WLAN which has a different WLAN identity, and the communication device is not acting as a hotspot responsible for routing IP packets for a second communication device of the wireless communication system.

14. The method of claim 11, further comprising: transmitting a first indication indicating the WLAN function of the communication device is enabled when WLAN function is switched from a disabled state to an enabled state.

15. The method of claim 11, further comprising: transmitting a second indication indicating the WLAN function of the communication device is disabled when the WLAN function is switched from an enabled state to a disabled state.

16. The method of claim 15, further comprising:
receiving a second message indicating the communication device to release the WLAN measurement configuration, from the network receiving the second indication; and
releasing the WLAN measurement configuration.

* * * * *